United States Patent [19]
Taketomi et al.

[11] Patent Number: 6,014,187
[45] Date of Patent: Jan. 11, 2000

[54] DISPLAY DEVICE

[75] Inventors: Yoshinao Taketomi, Kyoto; Shiro Asakawa, Nara; Eiichiro Okuda, Osaka, all of Japan

[73] Assignee: Matsushita Electric Industrial Co., Ltd., Osaka, Japan

[21] Appl. No.: 09/118,259

[22] Filed: Jul. 17, 1998

Related U.S. Application Data

[62] Division of application No. 08/989,579, Dec. 12, 1997, Pat. No. 5,864,375, which is a division of application No. 08/603,036, Feb. 16, 1996, Pat. No. 5,731,853.

[30] Foreign Application Priority Data

Feb. 24, 1995 [JP] Japan ..................................... 7-036825

[51] Int. Cl.$^7$ ....................... G02F 1/1335; G02F 1/1333; G02F 1/13
[52] U.S. Cl. .............................. 349/15; 349/86; 349/202; 349/92; 359/23
[58] Field of Search ................................ 349/15, 86, 201, 349/202; 359/23, 25, 3, 7, 15; 345/32

[56] References Cited

U.S. PATENT DOCUMENTS

| | | | |
|---|---|---|---|
| 4,878,717 | 11/1989 | Gerritsen ................................. | 350/3.66 |
| 4,993,790 | 2/1991 | Vick ........................................ | 350/3.73 |
| 5,113,272 | 5/1992 | Reamey .................................... | 359/15 |
| 5,264,964 | 11/1993 | Faris ........................................ | 359/465 |
| 5,299,037 | 3/1994 | Sakata ..................................... | 349/1 |
| 5,465,175 | 11/1995 | Woodgate et al. ....................... | 359/463 |
| 5,506,701 | 4/1996 | Ichikawa .................................. | 359/15 |
| 5,561,537 | 10/1996 | Aritake et al. ............................ | 359/23 |
| 5,748,272 | 5/1998 | Tanaka et al. ............................ | 349/86 |
| 5,812,229 | 9/1998 | Chen et al. ............................... | 349/113 |
| 5,812,233 | 9/1998 | Walsh et al. ............................. | 349/194 |

FOREIGN PATENT DOCUMENTS

| | | |
|---|---|---|
| 0 324 482 | 7/1989 | European Pat. Off. . |
| 0 561 389 | 9/1993 | European Pat. Off. . |
| 0 570 179 | 11/1993 | European Pat. Off. . |
| 62-184436 | 8/1987 | Japan . |
| 5-181401 | 7/1993 | Japan . |
| 6-308331 | 11/1994 | Japan . |
| 5-173196 | 7/1996 | Japan . |
| WO 91/10926 | 7/1991 | WIPO . |

OTHER PUBLICATIONS

Aug. 1996 "A liquid crystal/polymer optical device formed by holography for reflective color display applications" K. Tanaka et al., PDLC–2, pp. 109–111. NTT, Interdisciplinary Laboratories, Tokyo, Japan.

*Primary Examiner*—William L. Sikes
*Assistant Examiner*—Dung Nguyen
*Attorney, Agent, or Firm*—Merchant & Gould, P.C.

[57] ABSTRACT

The liquid crystal display device according to this invention realizes three-dimensional picture images without using lenticular lenses etc. In addition, this liquid crystal display device has a transparent picture screen so that remote display picture images or three-dimensional picture images of high luminance are seen multiplexed with the background. The display device is constructed by arranging picture elements in which volume-phase type holograms are formed by a periodical construction of liquid crystals and polymers. Diffraction light from first picture element groups which are distributed uniformly reaches a left eye of an observer while diffraction light from second picture element groups which are distributed uniformly reaches a right eye of an observer. The condition of the picture elements are switched to diffract irradiated light or to transmit the light, thus a desired picture image comprising a dot matrix can be displayed. The first picture element groups display parallax picture for the left eye, and the second picture element groups display parallax picture for the right eye.

10 Claims, 15 Drawing Sheets

DISPLAY DEVICE

This application is a Divisional of application Ser. No. 08/989,579, filed Dec. 12, 1997, now U.S. Pat. No. 5,864,375, which is a Divisional of application Ser. No. 08/603,036, filed Feb. 16, 1996, now U.S. Pat. No. 5,731,853, which application(s) are incorporated herein by reference.

FIELD OF THE INVENTION

This invention relates to a display device which enables three-dimensional picture display using a polymer-dispersed type liquid crystal.

BACKGROUND OF THE INVENTION

A polymer-dispersed type liquid crystal display device disperses liquid crystals into polymers and uses the scattered light. This liquid crystal display device does not need a polarizing plate so it can provide a clearer picture compared to a TN type liquid crystal display device. Therefore, the polymer-dispersed type liquid crystal display device has been actively developed. FIG. 13 shows an example of a conventional polymer-dispersed type liquid crystal display device. In this drawing, 51 is a polymer-dispersed liquid crystal (PDLC) layer, 52 is a transparent substrate, 53 and 54 are transparent electrodes, 55 is a photo-absorbing plate, and 56 is a color filter.

The liquid crystals dispersed into the polymer base material are arranged disorderly, or they are in a scattered state. When voltage is applied between the pair of transparent electrodes (53, 54) which face each other across the PDLC layer 51, the liquid crystals become orderly, namely transparent. The process can be reversed. The transparent electrodes 53 and 54 are constructed to have picture elements formed on the transparent substrate 52.

The liquid crystal display device displays pictures using external light like natural light or indoor light. The light beam entering through a color filter 56 passes the PDLC layer 51 and is absorbed by the photo-absorbing plate 55 when the picture elements are transparent. So, the observer sees the light as black. The light that enters the scattered picture elements (the shaded portion) is partly scattered, and passes the color filter 56 again to outgo at a wide angle. So the observer sees it as colored light.

FIG. 14 shows another well-known example of a conventional three-dimensional (3-D) picture display device, in which a lenticular lens 57 and a display device 58 are combined. The lenticular lens 57 is constructed by arranging a number of long and narrow cylindrical lenses. The lenticular lens is disposed in front of the display device 58 like a CRT or a liquid crystal display.

The picture image shown in the display device 58 is divided into pairs of frames arranged alternately in a stripe pattern. The plain-colored stripes constitute first frames 59 while the shaded stripes constitute second frames 60.

When the first frames 59 display a parallax picture for a right eye and the second frames 60 display a parallax picture for a left eye, the parallax picture for the left eye is caught only by the left eye of an observer at a predetermined position, while the parallax picture for the right eye is caught only by the right eye of the observer, due to the function of the lenticular lens. For the observer 61, the picture image seems to appear on the display screen like a 3-D picture.

However, such a conventional liquid crystal display device only provides a picture with inferior luminance because of the following reason. As shown in FIG. 15, the light beam enters, passes the PDLC layer, and forms scattered light. This is generally known as front scattering. Back scattering is a scattering to the back side (incident side). In a PDLC layer, back scattering never exceeds front scattering. According to the conventional technique, more than half of the light which enters scattering picture elements is absorbed by the photo-absorbing plate 55. Therefore, the luminance of the picture is always low, and it is difficult to constitute a direct-view display.

In addition, the PDLC layer 51 and the transparent electrodes (53, 54) are sandwiched by the photo-absorbing plate 55 and the color filter 56. Even if the PDLC layer 51 becomes transparent because of voltage application, this property cannot be fully utilized. Further, it is impossible to display 3-D pictures with the conventional structure. The 3-D picture display device in FIG. 14 needs a lenticular lens, so the device cannot provide a transparent display picture.

SUMMARY OF THE INVENTION

The object of this invention is to provide a display device which enables a 3-D picture display without using a lenticular lens etc., a bright direct-view display device, a display device having a transparent picture display part, and further a display device that enables color display.

In order to obtain these advantages, a first display device of this invention has electrode layers inside two substrates which are facing each other, and a light-modulating layer between these electrode layers. The light-modulating layer comprises liquid crystal phases and polymer phases distributed as holograms. At least one of the two pairs of substrates and electrode layers is transparent. The electrode layers are patterned so that picture elements arranged in a matrix are formed. The light-modulating layer sandwiched between the electrode layers comprises first picture element groups and second picture element groups distributed almost uniformly in stripe or in mosaic form. On each of the picture elements of the first groups, a hologram is formed to diffract the irradiated light beams in the direction of the observer's left eye. On each of the picture elements of the second groups, another hologram is formed to diffract the irradiated light beams in the direction of the observer's right eye.

According to the first embodiment of this invention, the voltage applied to the electrode layers is controlled for every picture element, and a parallax picture for a left eye is displayed on the first picture element groups while a parallax picture for a right eye is displayed on the second picture element groups. Thus a 3-D picture display is realized without lenticular lens etc. If the two pairs of substrates and electrode layers are transparent and a light beam is irradiated from behind at a predetermined incident angle, a display device with high luminance, which has a transparent picture display part and which enables to multiplex a displayed picture at the back, will be realized.

According to a second embodiment of this invention, the first picture element groups comprise hologram picture elements of red, blue and green which are distributed substantially uniformly. The hologram picture elements diffract the irradiated light beams of red, blue or green and turn them to the observer's left eye. The second picture element groups comprise hologram picture elements of red, blue and green which are distributed substantially uniformly. The hologram picture elements diffract the irradiated light beams of red, blue or green and turn them to the observer's right eye. For example, hologram picture elements of red, blue and green are repeatedly arranged by turns in the longitudinal direction of each picture element group arranged in stripe form. As a result, a color display will be realized.

According to a third embodiment of the invention, plural holograms are formed in multiplex on each of the picture elements of the first picture element groups. The holograms diffract the irradiated light beam and turn it to left eyes of plural observers at different positions. Plural holograms are formed in multiplex on each of the picture elements of the second picture element groups. The holograms diffract the irradiated light beam and turn it to right eyes of plural observers at different positions.

According to this embodiment, it is possible to provide the same 3-D picture for plural observers. Similar to the above-mentioned embodiment, a color display will be realized by distributing hologram picture elements of red, blue and green substantially uniformly on each of the picture element groups.

A fourth display device of this invention has electrode layers inside two substrates which are facing each other, and a light-modulating layer between these electrode layers. The light-modulating layer comprises liquid crystal phases and polymer phases distributed as holograms. At least one of the two pairs of substrates and electrode layers are transparent. The electrode layers are patterned so that picture elements arranged in a matrix are formed. The light-modulating layer sandwiched between the electrode layers comprises picture element groups of 2 n kinds which are distributed substantially uniformly in stripe or in mosaic form, where n is a natural number bigger than 1. When k equals n or a natural number smaller than n, a hologram is formed on each of the picture elements composing the k-th picture element group. The hologram diffracts the irradiated light beam and turns it to the observer's left eye. On each of the picture elements composing the (k+n)-th picture element group, a hologram is formed to diffract the irradiated light beam and turn it to the observer's right eye.

According to this embodiment, it is possible to provide not only an independent picture (the same picture) but also different pictures for plural observers at different positions. A color display will be realized by distributing hologram picture elements of red, blue and green substantially uniformly on each of the picture element groups.

In the above-mentioned embodiments, a hologram is formed on each of the picture elements so that the diffraction light has a horizontal spread within a predetermined angle. Then, an observer can see a requested picture even if his position is shifted to the right or left to some degree. In addition, the position of the observer can be shifted vertically as well as horizontally to some degree if a hologram is formed, and its diffraction has a predetermined emission angle.

BRIEF DESCRIPTION OF THE DRAWINGS

FIG. 8A is a basic construction in which a light source is disposed behind the display device. FIG. 8B is a variation in which a light source is disposed in front of the display device. And FIG. 8C is another variation in which indoor light or natural light is used for the light source.

DETAILED DESCRIPTION OF THE INVENTION

A preferable embodiment is explained below referring to some Examples and drawings.

EXAMPLE 1

Figure 1:
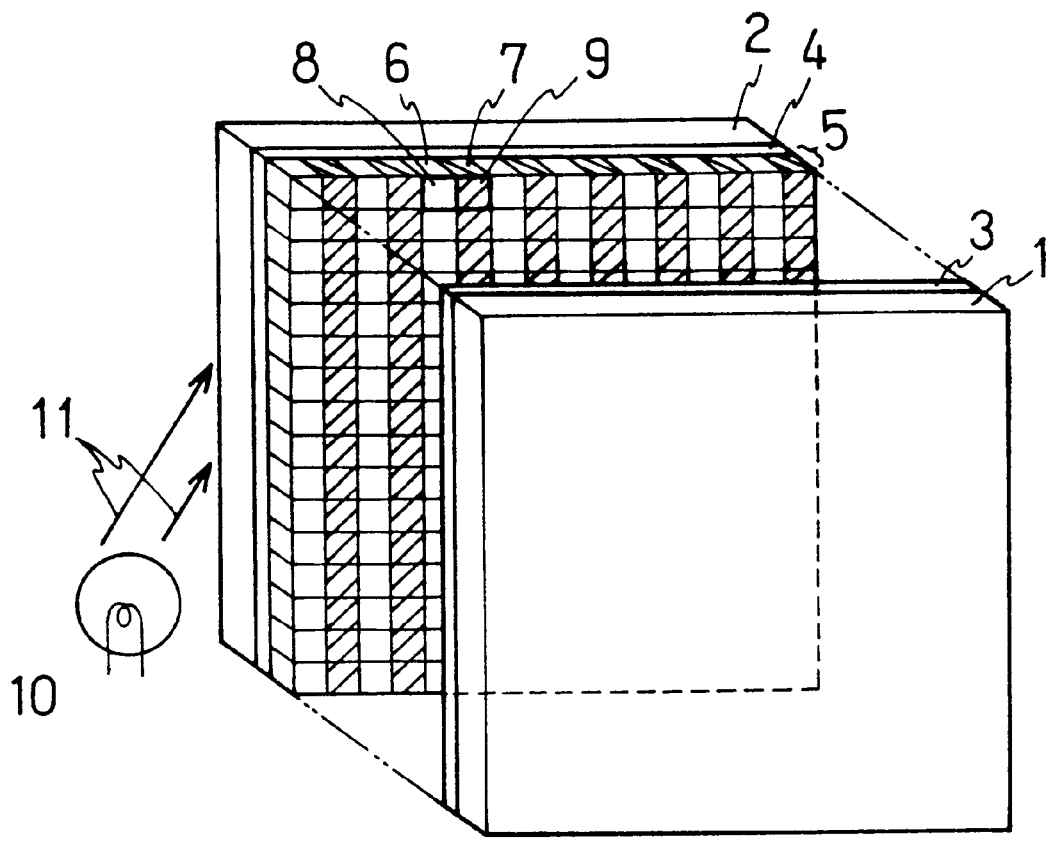
FIG. 1 shows the construction of the display device relating to Example 1 of this invention.

FIG. 1 shows the construction of a display device of the first embodiment of this invention. In FIG. 1, numerals 1 and 2 are transparent glass substrates, and 3 and 4 are transparent electrode layers. Numeral 5 is a light-modulating layer that comprises first picture element groups 6 and second picture element groups 7 arranged alternately in stripes. In FIG. 1, the picture element groups 6 comprise picture elements 8 arranged vertically, while the picture element groups 7 comprise picture elements 9 arranged vertically. The picture element 8 is indicated as a plain cell, and the picture element 9, as a shaded cell. Numeral 10 is a light source and light beam 11 is irradiated from the backside of the transparent glass substrate 2. For the sake of convenience, the light-modulating layer 5 is drawn separated from the electrode layer 3, though actually, the two layers are adhered to each other.

Figure 2:
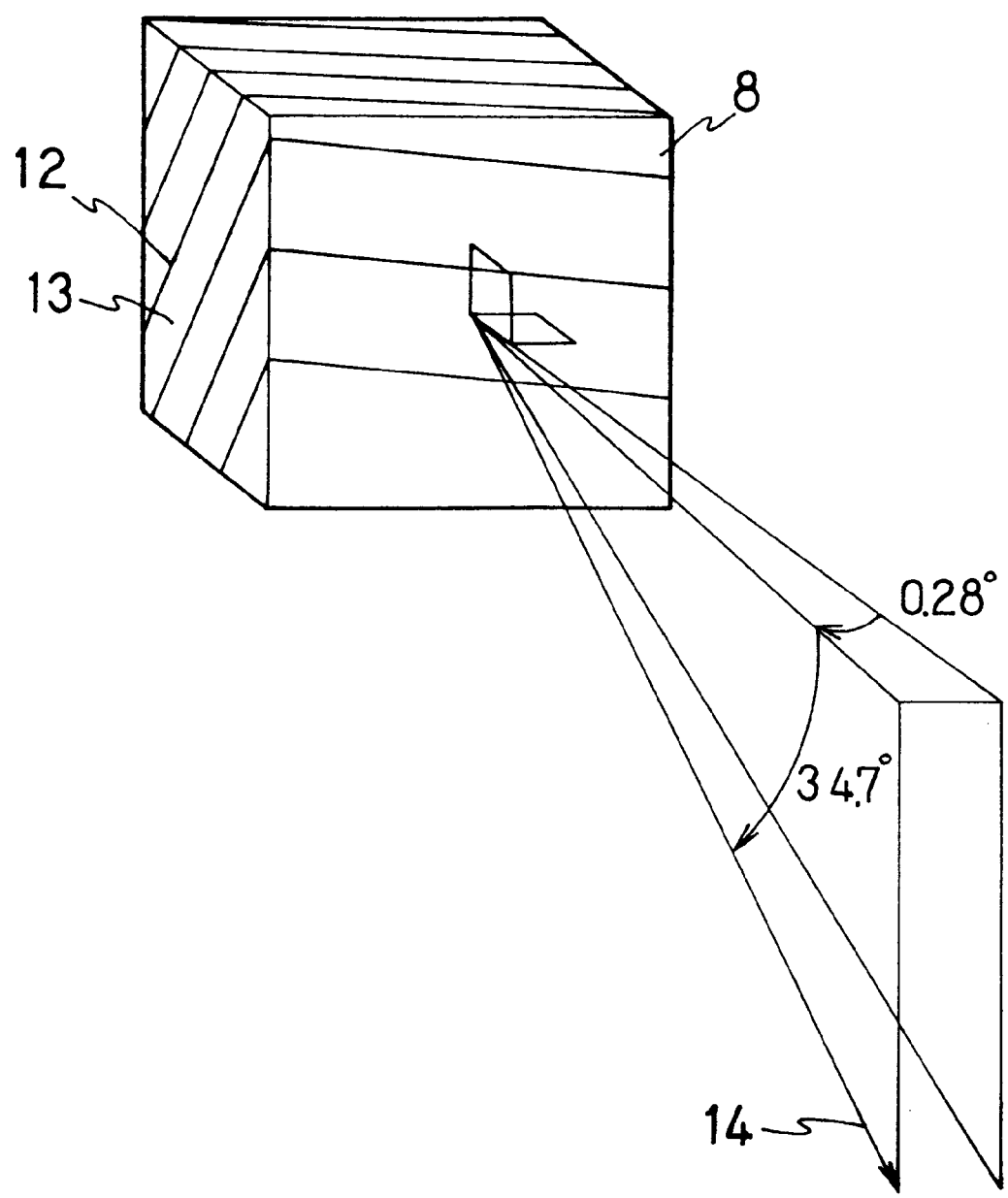
FIG. 2 shows the function of a picture element composing the first picture element groups of the display device of FIG. 1.

FIG. 2 shows the simplified typical construction of the picture element 8 composing the picture element group 6. The picture element 8 has a periodical construction in which polymer phases 12 and liquid crystal phases 13 are alternately formed. The pitch is about 0.3 micron, and the thickness of the picture element is about 10 microns. The direction of the periodical construction, or grating vector 14, inclines 0.28° toward the left side and about 34.7° downward from the normal line of the picture element surface.

Figure 3:
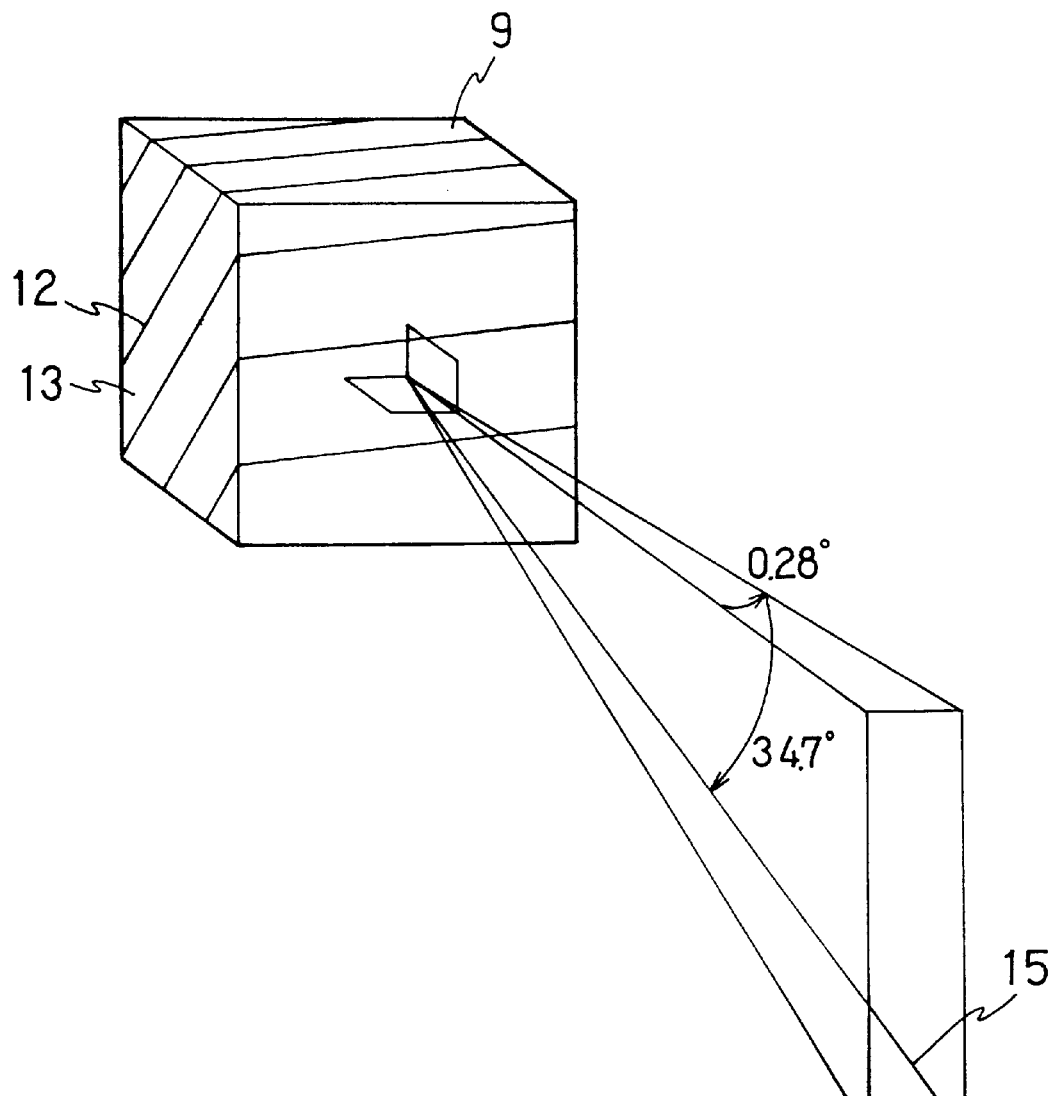
FIG. 3 shows the function of a picture element composing the second picture element group of the display device of FIG. 1.

The picture element 9 composing the picture element groups 7 also has a periodical construction as shown in FIG. 3. The direction of the typical periodical construction, or grating vector 15, inclines about 34.7° downward and about 0.28° to the right side.

The periodical constitution is made by the following steps:

mixing photosensitive monomers and/or oligomers, a nematic liquid crystal, a polymerization initiator and a sensitizer to prepare a precursor;

sandwiching the precursor between the electrode layers (3, 4) inside the glass substrates (1, 2);

writing patterns by irradiating interference patterns formed by an argon laser of 515 nm; and polymerizing the entire surface by irradiating ultraviolet ray by a low-pressure mercury vapor lamp.

A ethylenic unsaturated monomer which is liquid or has a low melting point, especially acrylic or methacrylic esters, is suitable for making a light-modulating layer by photo-polymerization. These monomers may be polyfunctional monomers like trimethylpropane triacrylate, or oligomers like poly(ethylene glycol)diacrylate and urethane acrylate. These can be used individually or in combination. Moreover, other monomers like styrene or carbazole can be used if necessary.

These monomers and oligomers are not particularly limited. An expert may selectively use well-known monomers and oligomers like those used for making a polymer-dispersed type liquid crystal, or a photo-polymerization composition for making a volume hologram described in Japanese Laid Open (Tokkai-Hei) No. 2-3082. In conducting photo-polymerization by coherent light, a sensitizing dye suitable to the wavelength, and appropriate photopolymerizing initiator etc. are needed. This can be selected from a lot of combinations like cyanine dyes, dyes of cyclopentanone, diphenyl iodonium salt, or the combination of diphenyl iodonium salt and dyes, quinones, triphenyl imidazole diner and hydrogen donor. A liquid crystal having a larger birefringence and dielectric anisotrophy and a smaller elastic constant is suitable for the purpose. Such a liquid crystal can be selected from commercially available liquid crystals.

Figure 4A:
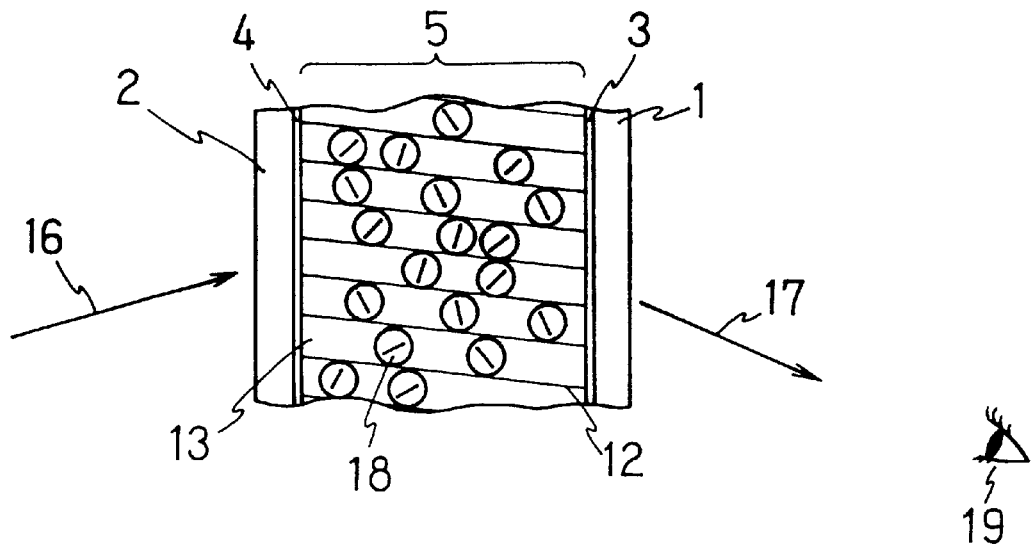
FIG. 4A shows the construction of every picture element of the display device of FIG. 1 in minute detail when voltage is not applied.
Figure 4B:
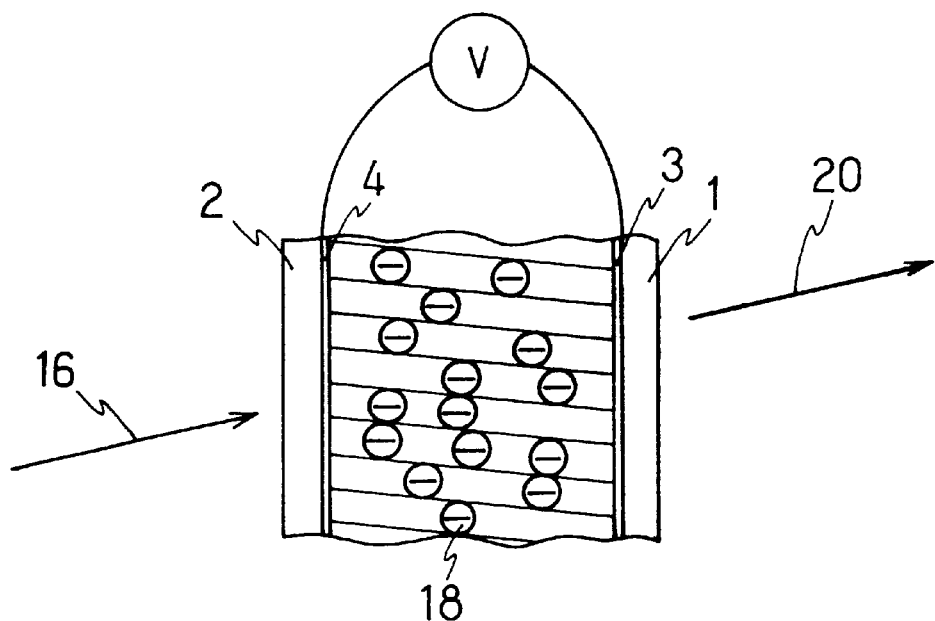
FIG. 4B shows the same construction when voltage is applied.

The function of the picture elements 8 and 9 is explained referring to FIGS. 4A and 4B. In these figures, a picture element like 8 or 9 which has a periodical construction is shown comprehrensively. In FIG. 4A, polymer phases 12 are expressed by inclined straight lines and liquid crystal phases 13 between the lines are phase-separated in a repeating pattern.

In the liquid crystal phases 13, liquid crystal molecules gather and form liquid crystal droplets 18. These liquid crystal droplets 18 are dispersed randomly and oriented in random directions. The average refractive index of the liquid crystal phases 13, which is equivalently defined, is bigger (e.g. 1.56) than that of the polymer phases 12 (e.g. 1.5).

The periodical construction formed by the polymer phases 12 and the liquid crystal phases 13 having different refractive indexes forms a hologram of the volume phase type. Accordingly, the incident light 16, which enters at a predetermined Bragg angle as shown in FIG. 4, is transformed to the diffracted light 17 with an extremely small loss, then efficiently reaches the eyes of an observer 19.

When a voltage is applied between the electrode layers (3,4) sandwiching the light-modulating layer 5 as shown in FIG. 4B, the liquid crystal droplets 18 in the liquid crystal phases 13 are oriented in the direction of the electric field.

As a result, the difference of refractive indexes of the polymer phases 12 and the liquid crystal phases 13 is lost, and the power to diffract the light of the light-modulating layer 5 is lost. As a result, the incident light 16 passes through the light-modulating layer 5 and becomes transmitted light 20. Therefore, the light beam does not reach the eyes of the observer 19. For the observer 19, the display device containing the light-modulating layer 5 and the transparent electrode layers (3, 4) looks transparent.

In this Example, the diffraction efficiency of each picture element is over 70%. In an experiment, a halogen lamp was used for the light source 10. In this experiment, the luminance of the display screen was as much as 2000 cd/m$^2$. The directivity of the diffracted light was so high that it was not observed from a position out of the course of the light. In other words, the display device seemed transparent when the observer 19 was not at the position shown in FIG. 4A. When an alternating current voltage of 100V was applied between the electrode layers 3 and 4, the luminance of the display screen was lowered to 100 cd/m$^2$ or less.

Figure 5:
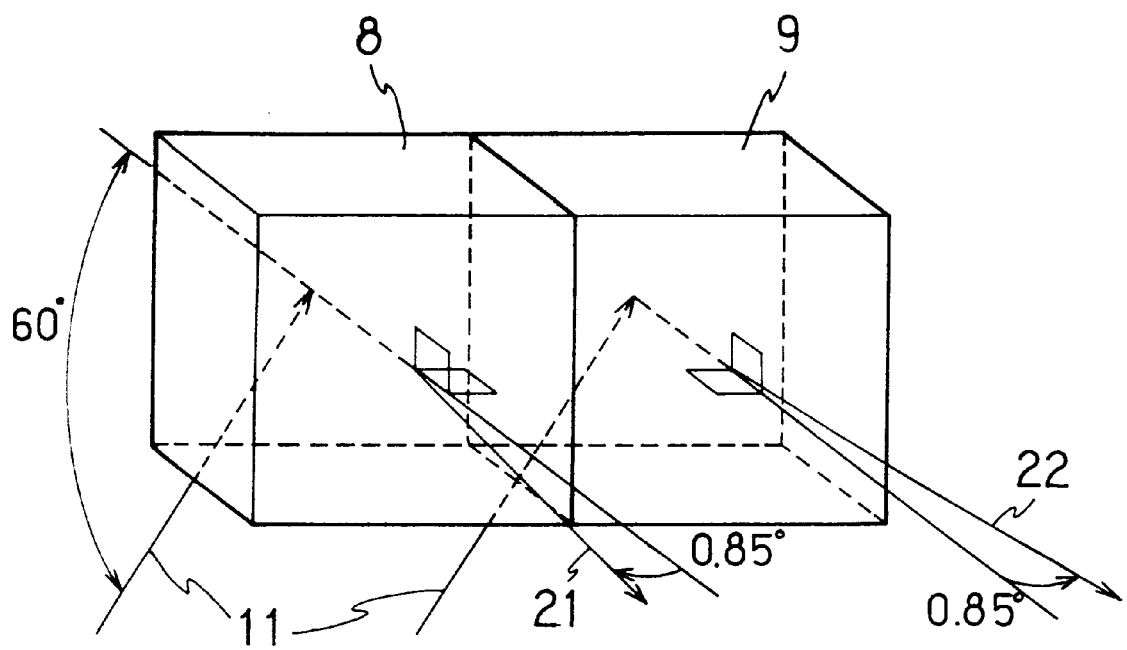
FIG. 5 is a perspective view to show the relation between the irradiated light and the diffraction light according to the display device of FIG. 1.

When irradiated light 11 enters from behind the abovementioned picture elements (8, 9) at an incident angle of about 60°, the light 21 which is diffracted by the picture element 8 and which outgoes from the front (turning to the observer) will outgo in the direction which is horizontal and inclines about 0.85° to the left from the observer's position as shown in FIG. 5. Similarly, the light 22 which is diffracted by the picture element 9 and which outgoes from the front will outgo in the direction which is horizontal and inclines about 0.85° to the right from the observer's position. As a result, if the observer is at a predetermined position, only the light beam 21 reaches the left eye, and only the light beam 22 reaches the right eye. This is peculiarly caused due to the angular selectivity of a thick hologram.

As mentioned above, the picture elements 8 and 9 are typical ones of the picture element groups 6 or 7. There is a little difference between the adjacent picture elements composing the picture element groups 6 or 7. Because of the variation, the diffraction light beam from the picture element groups 6 reaches the left eye of the observer, while the diffraction light beam from the picture element group 7 reaches the right eye.

Figure 6A:
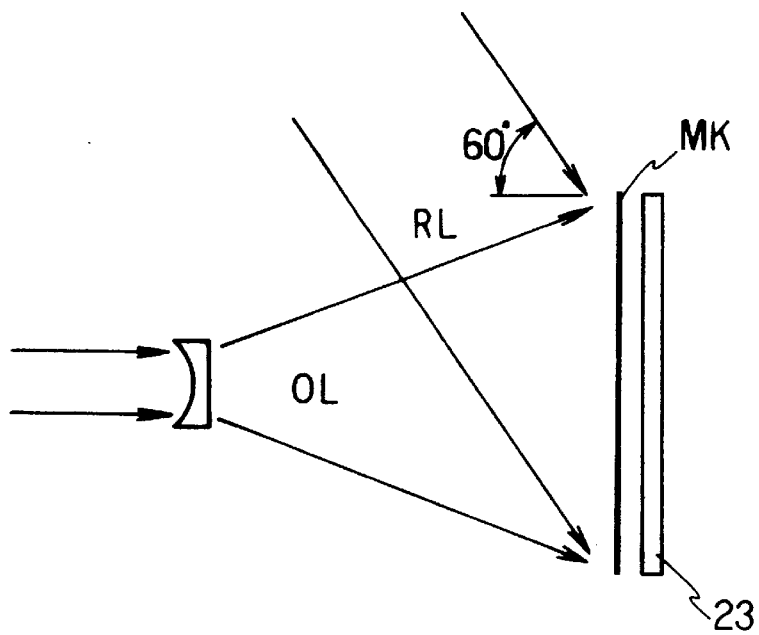
FIG. 6(A) is a side view to indicate the method of forming the display device of FIG. 1, in which the first picture element groups and the second picture element groups are formed alternately in stripes.
Figure 6B:
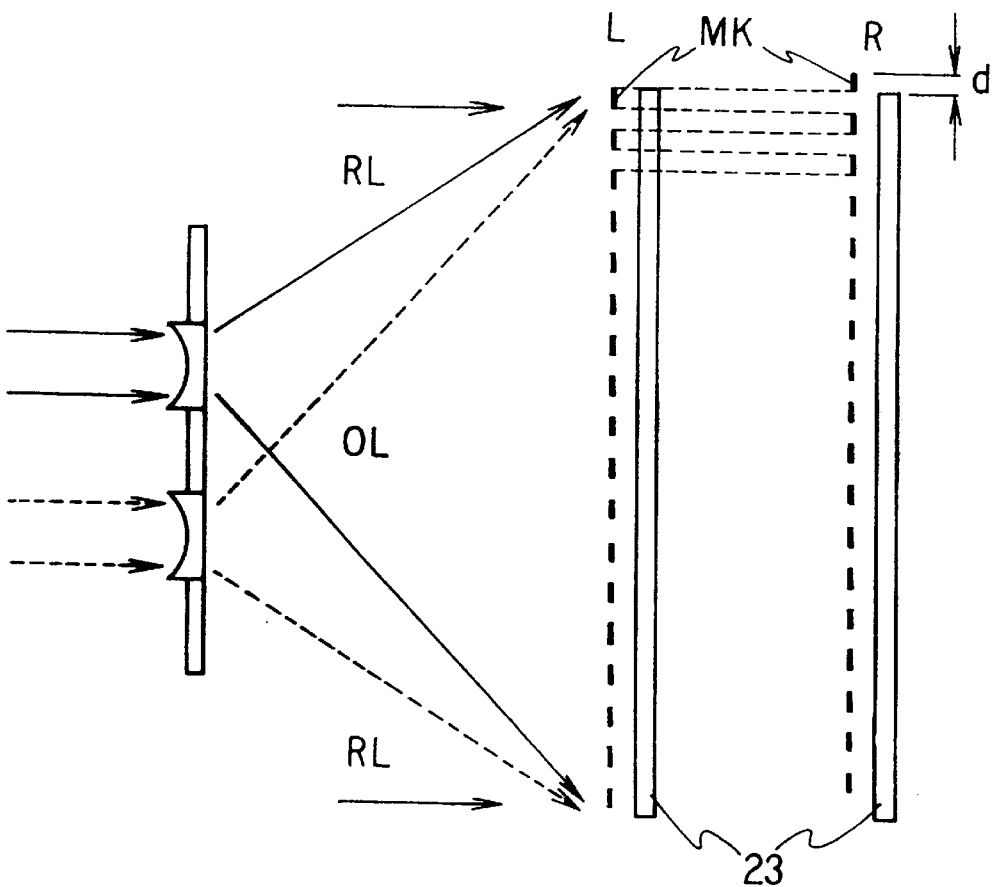
FIG. 6(B) is a plan view to indicate the same method.

In this hologram, picture element groups (6, 7) are arranged alternately in stripes so as to correspond to each of the eyes of the observer. The hologram in FIG. 6 can be made by using a mask plate MK in which slits of d width are arranged at every other position as shown in FIG. 6. The width (d) is equivalent to the width of one stripe. As shown in the side view of FIG. 6A and the plan view of FIG. 6B, object light OL is irradiated to fully spread in the display device 23 through a pair of concave lenses disposed at the position corresponding to both eyes of an observer located a predetermined distance from the front of the display device 23. At the same time, reference light RL is irradiated in the direction of the incident angle of 60° to the display device 23, and the interference patterns of the light beams are written on the light-modulating layer of the display device 23.

During this operation, the mask plate MK is disposed in front of the display device 23 as shown in FIG. 6B so that the direction of the slits becomes vertical. Then, only the object light OL for the left eye is irradiated. With this operation, the interference pattern for the left eye is written and the first picture element groups 6 are formed in stripes. Next, the mask plate MK is horizontally shifted by the width of the stripe (width of the slit) d, and the object light OL for the right eye is irradiated. With this operation, the interference pattern for the right eye is written, and the second picture element groups 7 are formed in stripes.

As shown in FIG. 1, the display device of this example has a light-modulating layer 5 sandwiched between the transparent electrode layers (3, 4) inside the transparent glass electrodes (1, 2). This construction is basically the same as a normal transmittance type liquid crystal display device. Each of the transparent electrode layers (3, 4) is patterned to constitute picture elements arranged in a matrix. In other words, the voltage applied between the transparent electrode layers (3, 4) of picture elements can be controlled independently. Thus, a desired picture image comprising a dot matrix can be displayed. Here, the term "display of picture image" means that voltage is not applied between the electrodes of the picture element composing the picture image, and the diffraction light of the picture image reaches the observer. Since voltage is applied to the other picture elements, the other picture elements are transparent, and the observer can see the background of the display device.

Figure 7:
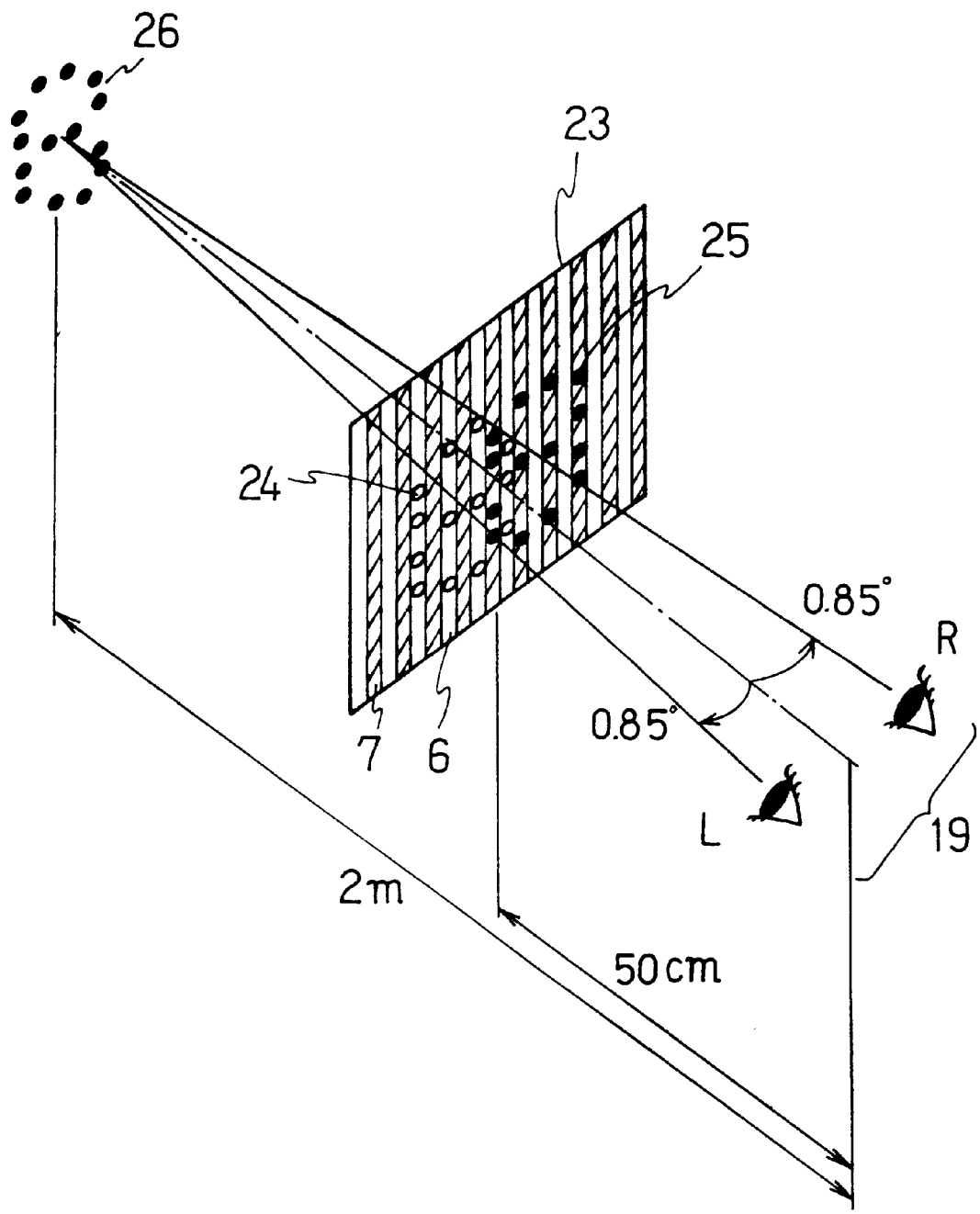
FIG. 7 indicates how the experiment is carried out using the display device of FIG. 1.

A simple experiment was conducted using such a display device. As shown in FIG. 7, numeral "8" is displayed on the first picture element groups 6 for the left eye (plain portions) and on the second picture element groups 7 for the right eye (shaded portions) respectively, shifted a little side to side. In FIG. 7, the picture image 24 displayed on the first picture element groups 6 is indicated with white dots while the picture image 25 displayed on the second picture element groups 7 is indicated with black dots.

The display device 23 was set separated from the observer 19 by 50 cm, and illuminated from behind at an incident angle of 60°. When the observer 19 saw the display device 23, the letter "8" appeared on the position behind the display device 23. The position was two meters away from the observer.

During the illumination, the other parts which do not display the numeral are transparent. Therefore, the "8" appearing on the picture screen seems overlapping with the backgrounds which is two meters away from the observer. In this example, the part to display the picture image is transparent, so the displayed picture image is multiplexed with the background of the display device and looks three-dimensional. Such an effect cannot be found from any other inventions of the field. Applying this technique, a remote focusing function of a head-up display of an automobile etc. can be realized.

The position where the image "8" appears, namely the distance from the observer will be decided geometrically depending on the interval of the shift between the image for the left eye displayed on the first picture element groups 6 and the image for the right eye displayed on the second picture element groups 7. It is clear from FIG. 7 that more and more separated, the two picture images seem to be appearing farther from the observer. If the image for the left eye and that for the right eye are shifted in the reverse direction, the picture image appears in front of the display device 23.

Instead of the letter "8", a three-dimensional object will be taken as an example. A pair of picture images which are a little different according to parallax of both eyes seeing the object is displayed on the picture element groups 6 and 7 respectively. Then the object appears three-dimensionally when the observer 19 sees the display device 23. In other words, a three-dimensional display device can be constituted using parallax without any lenticular lens or other means of conventional technique. When the same picture image is displayed on the picture element groups 6 and 7, instead of displaying different images according to the parallax, a three-dimensional picture cannot be obtained, but a picture image of high luminance may be obtained. The picture image seems to appear overlapping the background.

Figure 8A:
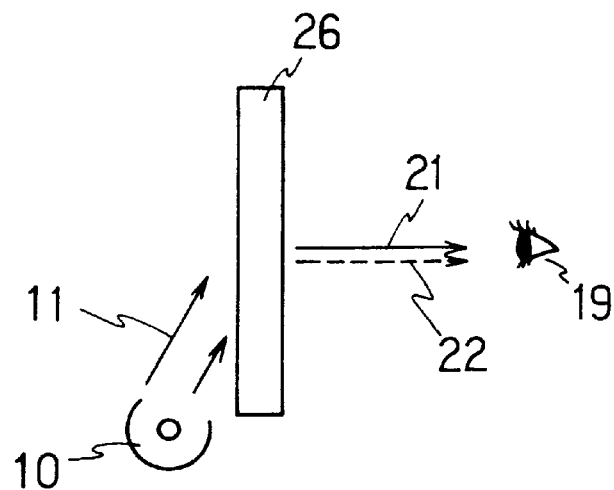
FIGS. 8A, 8B and 8C are side views to show other examples according to the light source for the display device of FIG. 1.
Figure 8B:
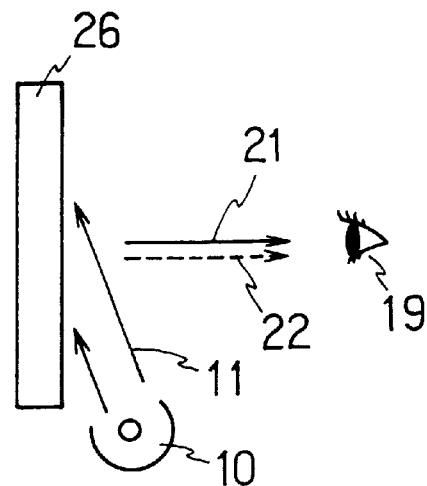
Figure 8C:
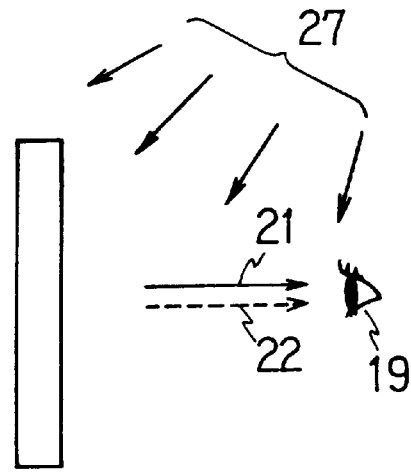

In this example, the light source 10 is disposed behind the display device 26, as shown in the side view of FIG. 8A, so the diffraction light passing through the display device 26 reaches the eyes of the observer. Or, according to FIG. 8B, the light source can be disposed in front of the display device 26 so that the diffraction light reflected by the display device 26 reaches the eyes of the observer. As shown in FIG. 8C, indoor light or natural light also can be used, if any specialized light sources are not provided. In this case, the transmitted diffraction light or the reflected diffraction light reaches the eyes of the observer. If the reflected diffraction light from the light source in front of the display device 26 reaches the observer, the substrate of the back-side and the electrode are not necessarily transparent.

The hologram picture element is formed so that the diffraction light from the picture element has been horizontally spread within a predetermined angle. Therefore, the observer can see a predetermined picture image even if his position is shifted a little to the left or to the right. In addition, the hologram picture element is constituted to be spread vertically within a predetermined angle, so that the diffraction light from the hologram picture element has an emission angle within a predetermined angle. Thus, the observer can see a predetermined picture image even if his position is shifted to some degree vertically and horizontally.

In this example, the first picture element groups 6 and the second picture element groups 7 comprise hologram picture elements of red, blue and green that are distributed substantially uniformly. The hologram picture elements respectively diffract the light beams of red, blue and green and turn them to the left or right eye of the observer. As a result, color display is realized.

Generally, hologram picture elements of red, blue and green are repeatedly arranged by turns to be distributed substantially uniformly in the vertical direction of the picture element groups (6, 7). Such a construction can be realized by using a mask plate following the method shown in FIG. 6. However, the mask plate is different from the mask plate MK in that apertures are formed horizontally in every other position and vertically in every third position in a matrix state. Here, an aperture corresponds to a picture element.

The object light and the reference light of red, blue and green are irradiated by turns, while shifting this mask plate vertically. As a result, picture element groups in which the hologram picture elements of red, blue and green are repeatedly arranged by turns are obtained. Therefore, the first picture element groups are formed by writing the hologram patterns three times while shifting the mask vertically. The second picture element groups are formed by writing the hologram patterns three times while shifting the mask horizontally. As a result, the display device which enables three-dimensional display and color display is manufactured by writing the hologram patterns six times, though the method is not limited to this example.

Figure 9:
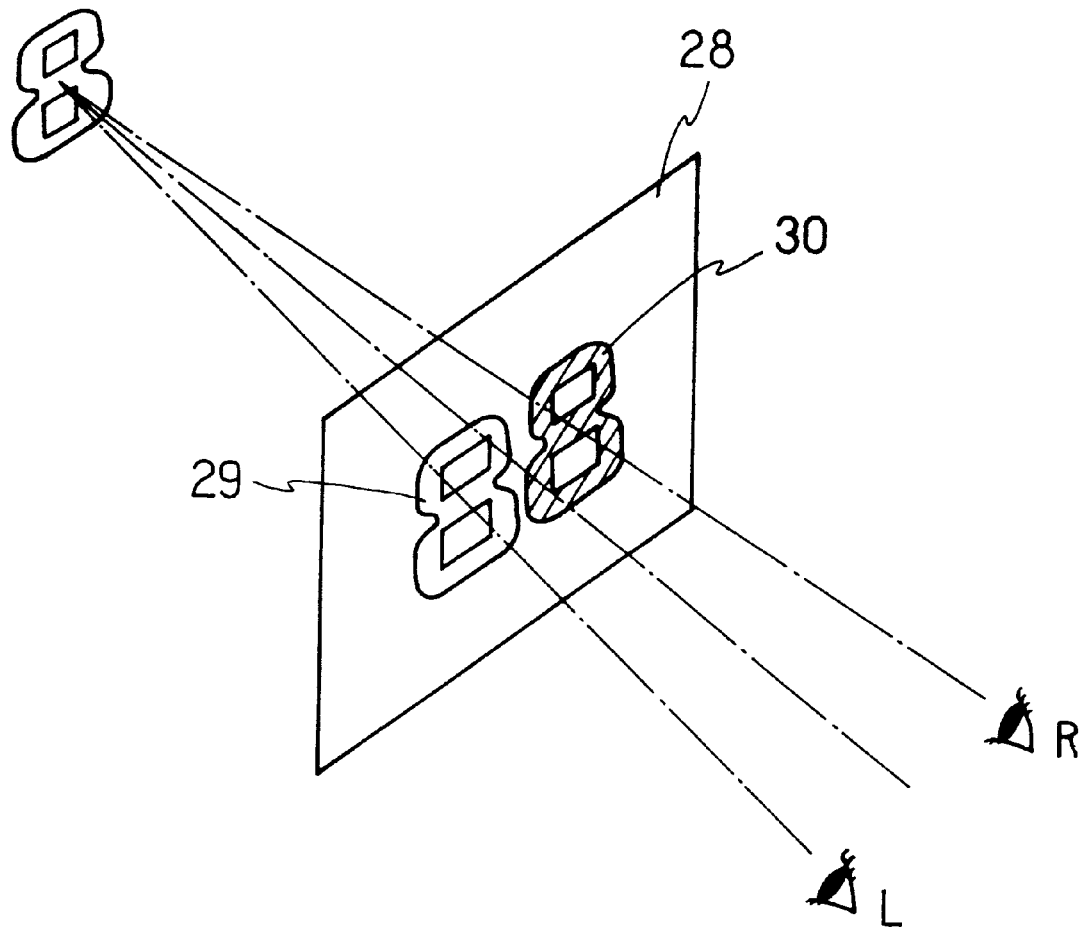
FIG. 9 is a perspective view of a variation of the display device of FIG. 1, in which hologram patterns of a stabilized picture image are written on the light-modulating layer of the display device.

The precondition of this example is that a desired picture image composed of a dot matrix is displayed on a display device by controlling the voltage applied between the electrode layers sandwiching the light-modulating layer for every picture element. It is also possible that a still picture image is written as a hologram pattern on a light-modulating layer of a display device 28. In FIG. 9, two hologram patterns (29, 30) displaying numeral "8" are written at the position shifted to the left and right. The first hologram pattern 29 turns the diffraction light to the left eye of the observer while the second hologram pattern 30 turns the diffraction light to the right eye of the observer. Such hologram patterns are formed by writing the interference pattern on the light-modulating layer of the display device 28. The interference pattern comprises the object light and the reference light which contain picture information like reflected light or transmitted light of an object.

Even in the still picture display, it is possible to control multiplexing of a picture image in the background when an observer sees the display device 28. For this purpose, the voltage applied between the electrode layer is controlled as a whole, or for every picture element.

EXAMPLE 2

In Example 1, the display device is constituted on the condition that only one observer exists. According to Example 2 described below, plural observers can see the same picture. This example will be explained according to the construction of the picture elements that are different from those of Example 1.

Figure 10:
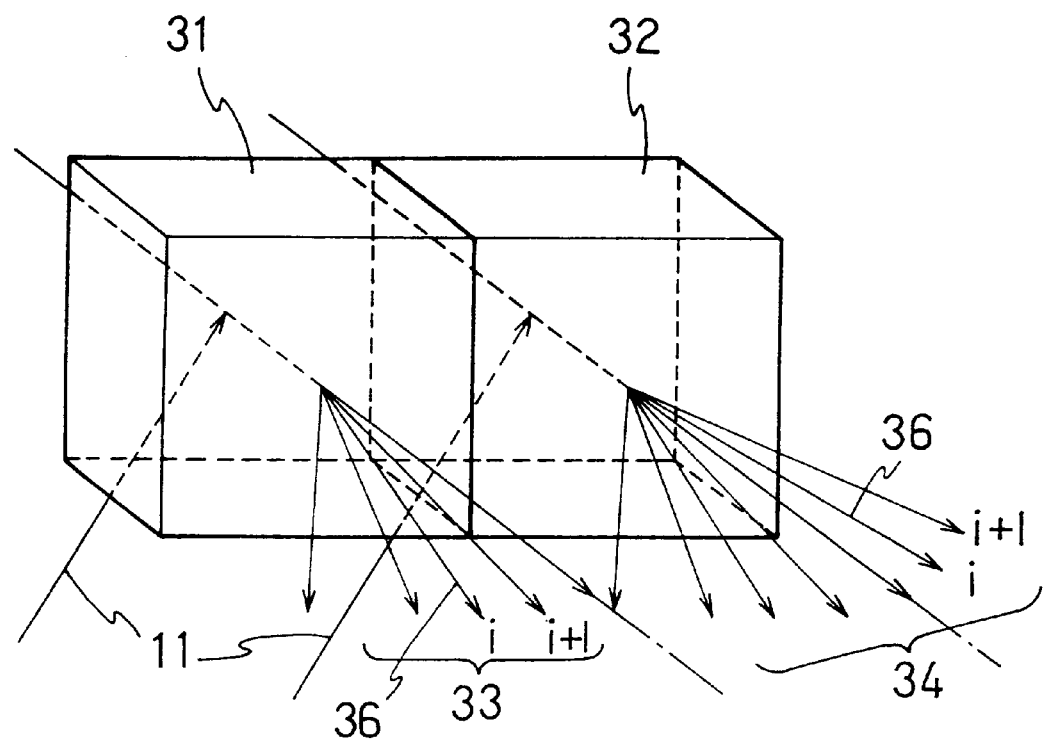
FIG. 10 is a perspective view to show the construction of the display device relating to Example 2 of this invention.

FIG. 10 indicates how the picture elements (31, 32) composing the display device of this example functions. These picture elements 31 and 32 are called multiplexed hologram picture elements to diffract an incident light beam from a direction to plural directions. Numeral 31 is a multiplexed hologram picture element for left eye, which turns the diffraction light to the left eyes of plural observers. Numeral 32 is a multiplexed hologram picture element for the right eye, which turns the diffraction light to right eyes of plural observers.

These multiplexed holograms are formed by multiplexing pairs of periodical construction of polymer phases 12 and liquid crystal phases 13 in the same cell. As mentioned in Example 1, a multiplexed hologram picture element is formed by:

sandwiching a precursor comprising photosensitive monomers (oligomers), nematic liquid crystal, polymerization initiator, sensitizer etc., between the glass substrates (1, 2) and the electric layers (3, 4);

irradiating an interference pattern formed by an argon laser of 515 nm to write patterns; and irradiating an ultraviolet light by a low-pressure mercury vapor lamp to polymerize the whole plate. During the writing step, different patterns are written by turns. More specifically, several patterns are written by turns while shifting the position of a pair of concave lenses according to the positions of observers. The lenses correspond to the left and right eyes. Such an operation is conducted when picture element groups which are arranged alternately like stripes are formed to correspond to both eyes, in a method using the mask plate MK of FIG. 6. Multiplexed hologram picture elements 31 and 32 are manufactured in this way.

The picture element 31 creates diffraction light for the left eye (33) in the different directions of n kinds to the light beam 11. The picture element 32 creates diffraction light for the right eye (34) in the different directions of n kinds to the light beam 11. And the i-th diffraction light beams 35 and 36 of the diffraction light beams for left and right eyes (32, 34) reach the left and right eyes of one observer.

Figure 11:
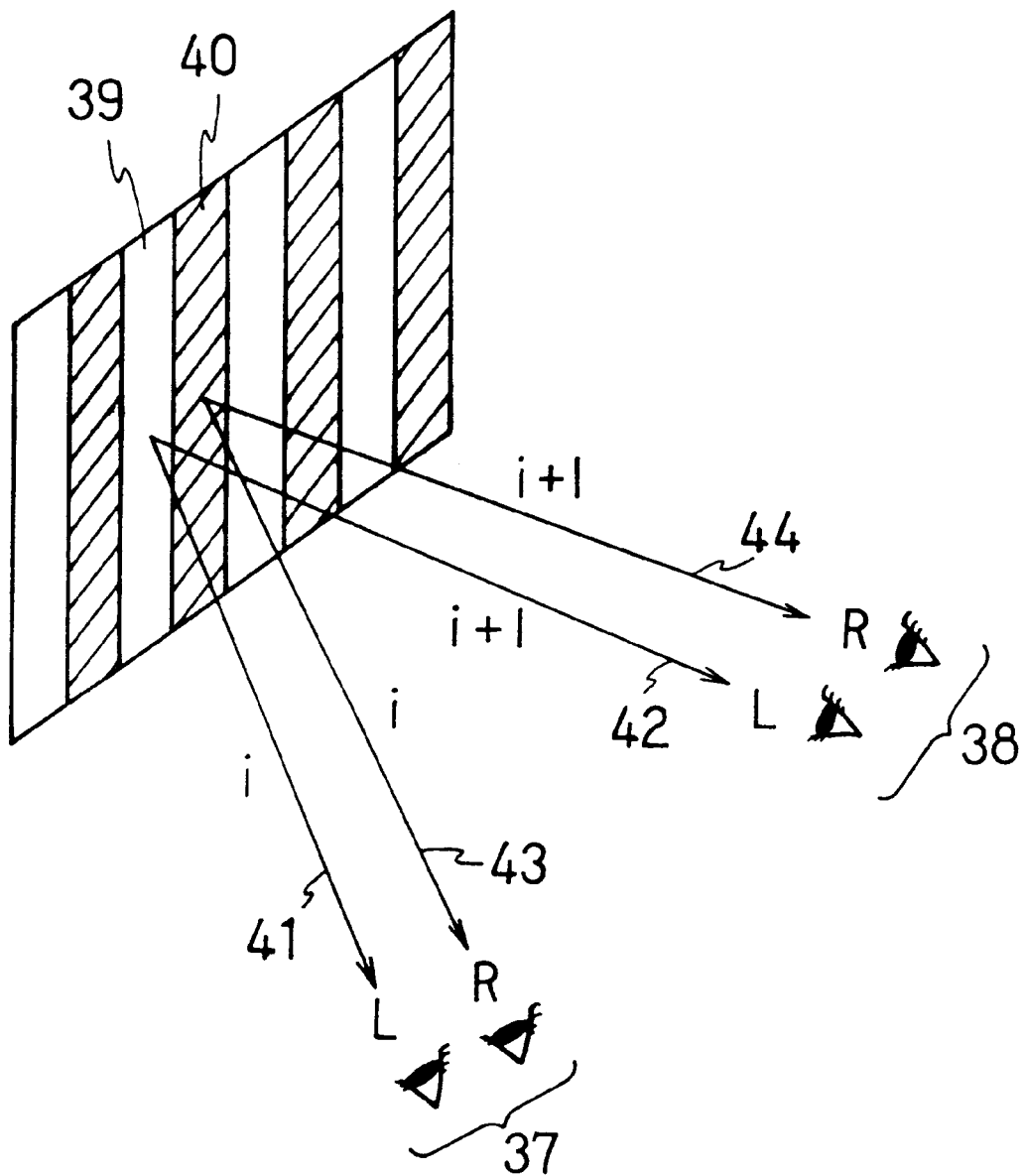
FIG. 11 is a perspective view to show the relation between the picture element groups and the observers according to FIG. 10.

FIG. 11 shows the i-th and (i+1)-th diffraction display light beams to indicate the relation between a display device and observers more in detail. The light beams reach the first observer (37) and the second observer (38), respectively. In FIG. 11, the picture element groups for the left eye (39) indicated with a plain stripe and the picture element groups for the right eye (40) indicated with a shaded stripe are arranged alternately. The picture element groups 39 are formed with multiplexed hologram picture elements 31 of FIG. 10 arranged vertically while the picture element groups (40) are formed with multiplexed hologram picture elements 32 arranged vertically.

The i-th diffraction light 41 from the picture element groups 39 reaches the left eye of the observer 37, and the (i+1)-th diffraction light 42 reaches the left eye of the observer 38. Similarly, the i-th diffraction light 43 from the picture element groups 40 reaches the right eye of the observer 37, and the (i+1)-th diffraction light 44 reaches the right eye of the observer 38. In this way, the same picture image is provided for two observers.

Similar to Example 1, a three-dimensional picture display can be provided to the observers by displaying different picture images on the picture element groups (39 and 40) to correspond to parallax picture of both eyes. In addition, a transparent display device having high luminance can be constituted by displaying the same picture image without providing parallax for both eyes. Similarly, the other variations like coloring described in Example 1 can be also applied to this example.

EXAMPLE 3

Figure 12:
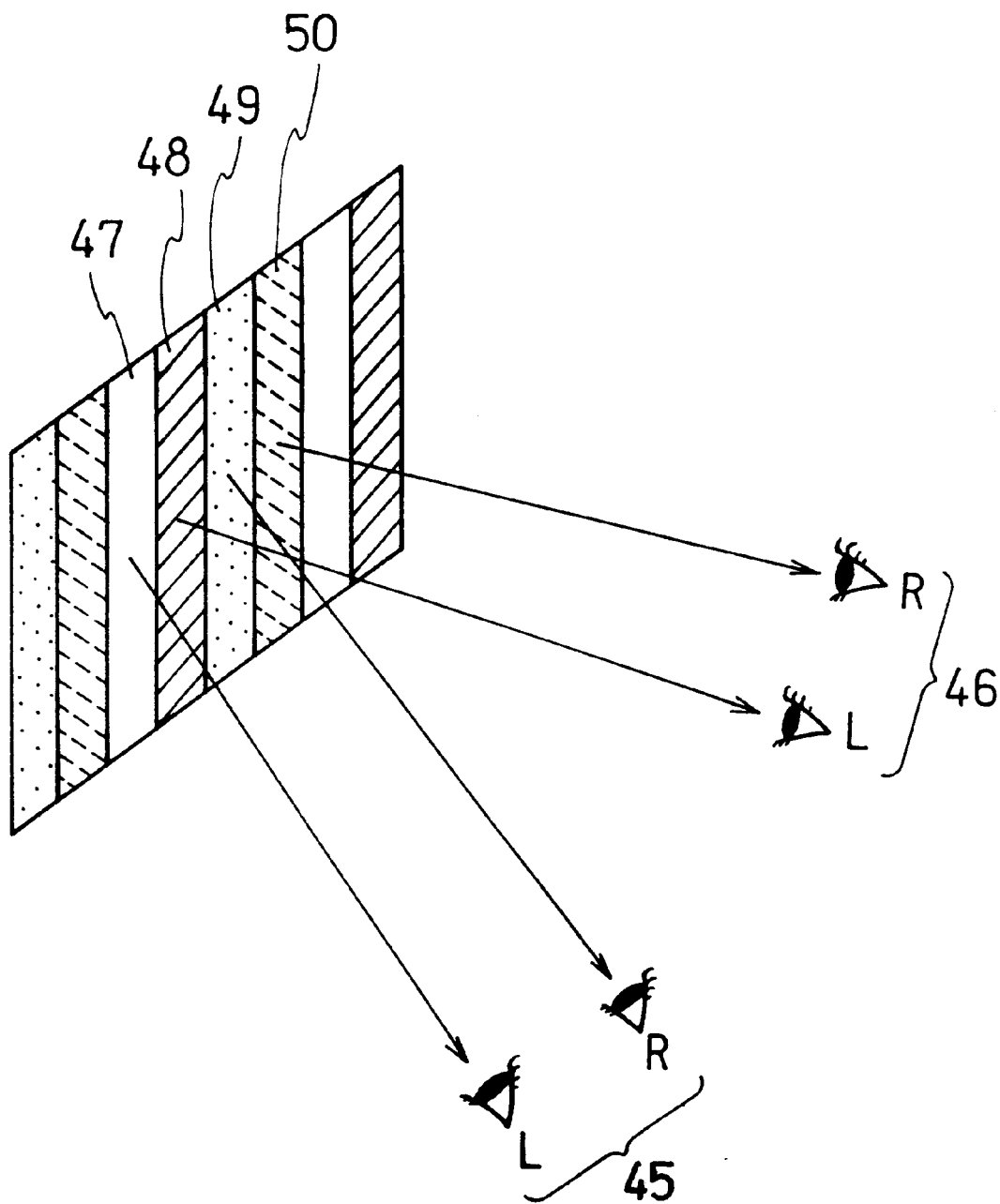
FIG. 12 is a perspective view to show the relation between the picture element groups and the observers according to Example 3 of the invention.
Figure 13:
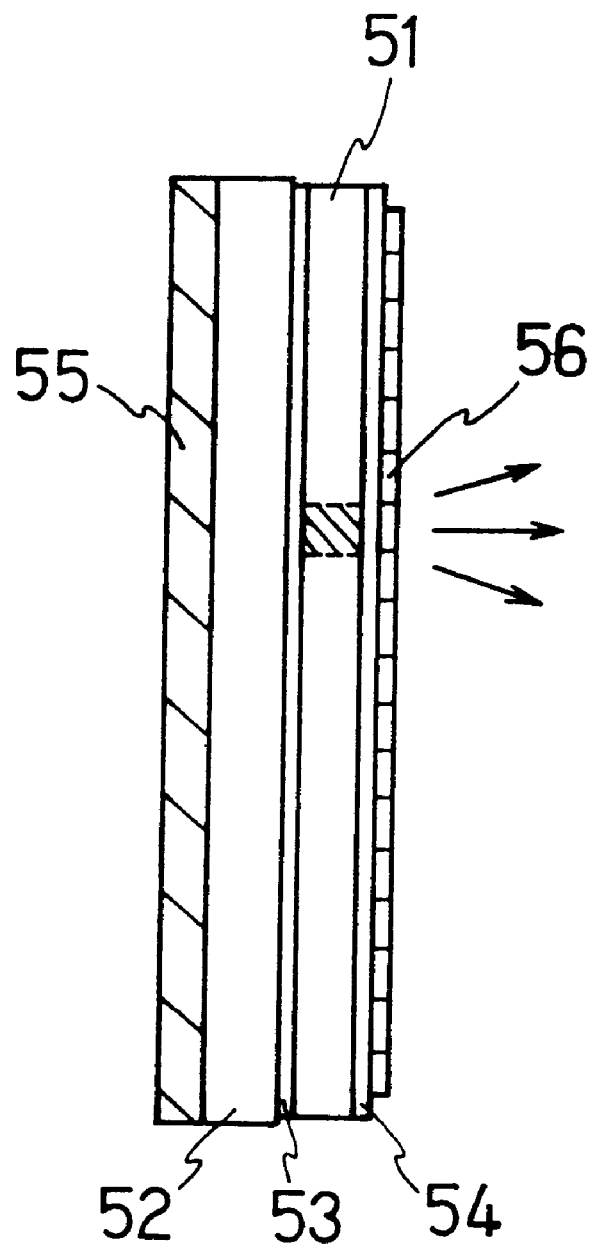
FIG. 13 is a cross-sectional view of a conventional polymer-dispersed type liquid crystal display device.
Figure 14:
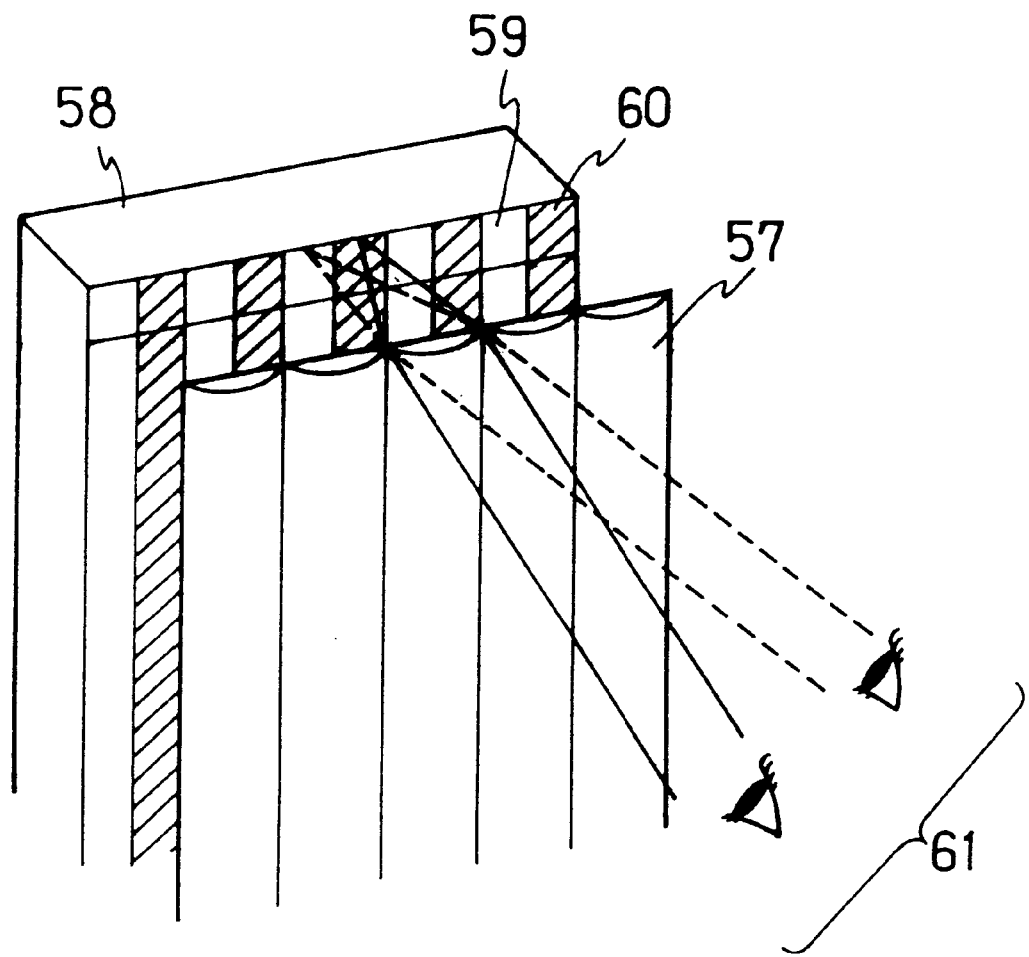
FIG. 14 is a perspective view of a conventional three-dimensional picture image display device.
Figure 15:
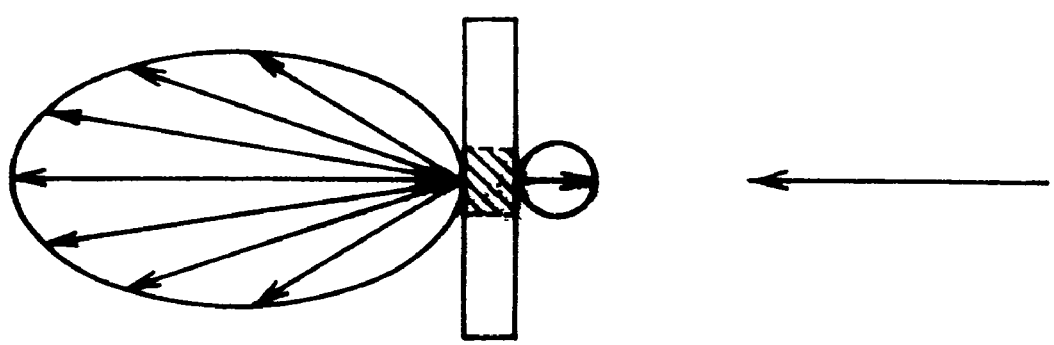
FIG. 15 shows the light scattering according to a conventional polymer-dispersed type liquid crystal display device.

The display device explained in Example 2 provides the same picture image for plural observers. It is also possible to realize a display device to provide different picture images for plural observers. FIG. 12 relates to a case that different picture images are provided for a first observer 45 and a second observer 46.

In FIG. 12, numeral 47 is the first picture element group to turn the diffraction light to the left eye of the first observer 45, 48 is the second picture element group to turn the diffraction light to the left eye of the second observer 46, 49 is the third picture element group to turn the diffraction light to the right eye of the first observer 45, and 50 is the fourth picture element group to turn the diffraction light to the right eye of the second observer 46. In this way, four kinds of picture element groups are repeatedly formed by turns.

According to this construction, it is possible to differentiate the picture image formed by the picture element groups (47 and 49) from that of the picture element groups (48 and 50). Accordingly, the two observers can see not only the same three-dimensional picture image but also independent three-dimensional picture images, respectively.

In the construction, four kinds of picture element groups are repeatedly formed by turns. In order to obtain this construction, hologram patterns are written four times, shifting a mask plate side-to-side. The mask plate having slits arranged at every four positions is used in place of the mask plate MK.

Generally, picture element groups of (2×n) kinds should be repeatedly formed by turns in order to provide n kinds of independent three-dimensional picture images for n number of observers. When $k \leq n$, the diffraction light of the k-th picture element groups and those of the (k+n)-th picture element groups reach the left and right eyes of an observer.

Similarly in this example, variations like coloring described in the Examples 1 and 2 can also be applicable.

The invention may be embodied in other forms without departing from the spirit or essential characteristics thereof.

The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A display device having a pair of electrode layers inside a pair of opposed substrates, and a light-modulating layer comprising liquid crystal phases and polymer phases as holograms being between the electrode layers;

wherein at least one of the two pairs of substrates and electrode layers is transparent, said electrode layers are patterned to form picture elements arranged in a matrix, said light-modulating layer comprises picture element groups of 2 n kinds distributed substantially uniformly in stripes or in mosaic where n is a natural number more than one, and when k is a natural number less than or equal to n, holograms are formed on each k-th picture element groups so as to diffract irradiated light and turn it in a direction of left eyes of observers while other holograms are formed on each (k+n)-th picture element groups so as to diffract irradiated light and turn it in a direction of right eyes of observers, whereby independent picture images are provided for plural observers at different positions.

2. The display device according to claim 1, wherein said k-th picture element groups display a parallax picture for the left eye and said (k+n)-th picture element groups display a parallax picture for the right eyes.

3. The display device according to claim 1, wherein holograms are formed on every picture element so that said diffraction light has a horizontal spread within a predetermined angle.

4. The display device according to claim 1, wherein holograms are formed on every picture element so that said diffraction light has a predetermined emission angle.

5. The display device according to claim 1, provided with a light source to radiate light which enters at least a predetermined incident angle from behind or in front of a picture screen.

6. A display device having a pair of electrode layers inside a pair of opposed substrates, and a light-modulating layer comprising liquid crystal phases and polymer phases as holograms being between the electrode layers;

wherein at least one of the two pairs of substrates and electrode layers is transparent, said electrode layers are patterned to form picture elements arranged in a matrix, said light-modulating layer comprises picture element groups of 2 n kinds distributed substantially uniformly in stripes or in mosaic where n is a natural number more than one, and when k is a natural number less than or equal to n, holograms of red, blue and green are formed on each k-th picture element groups so as to diffract irradiated light beams of red, blue and green and turn them in a direction of left eyes of observers while other holograms of red, blue and green are formed on each (k+n)-th picture element groups so as to diffract irradiated light beams of red, blue and green and turn them in a direction of right eyes of observers, whereby independent color picture images are provided for plural observers at different positions.

7. The display device according to claim 6, wherein said k-th picture element groups display a parallax picture for the left eye and said (k+n)-th picture element groups display a parallax picture for the right eyes.

8. The display device according to claim 6, wherein holograms are formed on every picture element so that said diffraction light has a horizontal spread within a predetermined angle.

9. The display device according to claim 6, wherein holograms are formed on every picture element so that said diffraction light has a predetermined emission angle.

10. The display device according to claim 6, provided with a light source to radiate light which enters at least a predetermined incident angle from behind or in front of a picture screen.

* * * * *